United States Patent [19]

Burkin et al.

[11] 3,846,893

[45] Nov. 12, 1974

[54] MECHANISM FOR FEEDING AND FIXING MAGNETIC CORES IS A MEMORY MATRIX INTERWEAVING DEVICE

[76] Inventors: Jury Alexandrovich Burkin, Tsvetnoi proezd 29, kv. 24; Jury Emelyanovich Seleznev, Vesenny proezd 4a, kv. 16, both of Novosibirsk, U.S.S.R.

[22] Filed: Aug. 15, 1973

[21] Appl. No.: 388,415

[30] Foreign Application Priority Data

Dec. 18, 1972 U.S.S.R. .......................... 1862912

[52] U.S. Cl. .......................................... 29/203 MM

[51] Int. Cl. .......................................... H05k 13/04

[58] Field of Search.. 29/203 MM, 203 R, 203 MW, 29/203 D, 203 P

[56] References Cited

UNITED STATES PATENTS 3,381,357 5/1968 Billingsley et al. ............ 29/203 MM 3,698,057 10/1972 Warner et al. ................ 29/203 MM

*Primary Examiner*—Thomas H. Eager

*Attorney, Agent, or Firm*—Holman & Stern

[57] ABSTRACT

A mechanism for feeding and fixing magnetic cores in a memory matrix interweaving device is defined as a shaft having a longitudinal slot for catching magnetic cores strung in piles on wires. Located over the shaft length are recesses arranged transversely to the longitudinal slot, with said recesses having a width large enough to accommodate therein the bottom magnetic cores of the piles, while the depth of the recesses exceeds that of the longitudinal slot, as a result of which the edges formed by the bottom of the longitudinal slot and the side walls of the recesses define two stops for holding magnetic cores in the longitudinal slot.

1 Claim, 1 Drawing Figure

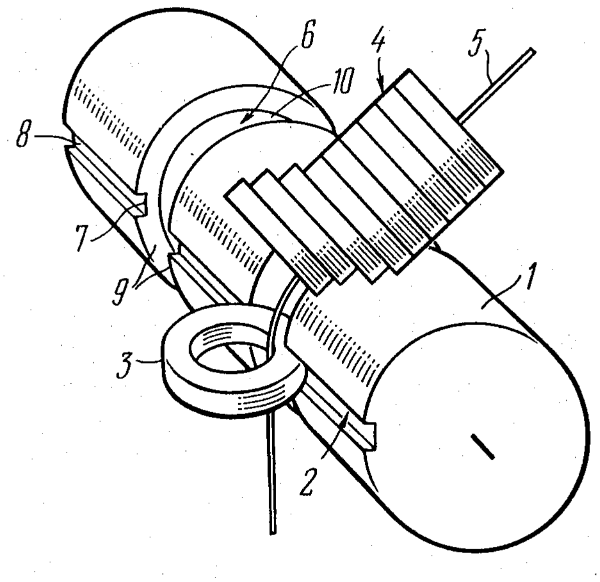
1
2
3
4
5
6
7
8
9
10

MECHANISM FOR FEEDING AND FIXING MAGNETIC CORES IS A MEMORY MATRIX INTERWEAVING DEVICE

BACKGROUND OF THE INVENTION

This invention relates in general to process equipment used in manufacturing the memory registers of electronic computers, and in particular to a mechanism for feeding and fixing magnetic cores in a memory-matrix interweaving device.

The invention can find application for a piecewise feeding (row-after-row) and fixing in an oriented state of magnetic cores of a variety of sized, microminiature ones inclusive, as strung on wires in piles, when interweaving memory matrices with a wire wound in a coil as well as in counting the quantity and monitoring the quality of said magnetic cores.

To carry out the operations of interweaving, counting or quality control of magnetic cores, one must first separate one magnetic core from each pile, then feed said magnetic core to a definite place and fix the core in position.

PRIOR ART

Known at present is a mechanism for one-by-one feeding and fixing of magnetic cores strung on wires in piles, for example, the one making an integral part of a device for producing a memory cube.

The known device incorporates a frame having fixed thereon at a slight tension the rows of wires carrying magnetic cores strung in piles thereon, with said rows of wires being accommodated in the recesses of a dispenser which is the feeding and fixing mechanism for magnetic cores in said device.

The dispenser is defined as a shaft having at least one longitudinal slot for catching magnetic cores, with the depth of said slot being equal to half the difference of the inside and outside diameters of magnetic cores, and the width of the slot corresponds to the height of the cores.

The device is provided with a coil-forming mechanism held to the frame and located at the face end of the dispenser. The coil-forming mechanism serves to wind up the wire interweaving magnetic cores into a coil and is defined as a taper spindle placed in between two blocks.

In the known device for making a memory cube, the one-by-one feeding and fixing of magnetic cores is as follows:

The shaft separates the bottom magnetic core from each pile, whereupon the shaft is rotated to arrange the cores in a row. This done, the cores are fixed in this position by being held down against the shaft with the wires on which they are strung. Thus, the most strict holding of the magnetic cores is attained in the plane perpendicular to the direction of said wires in the so-called holding zone.

In this position, magnetic cores are interwoven with a wire wound in a coil which is formed in the coil-forming mechanism, with the lead of the coil being equal to the spacing of the magnetic cores arranged in a row on the shaft. Interweaving is carried out by rotating the coil and imparting feed motion thereto. Then, the coils with the interwoven magnetic cores are removed from the shaft by further rotating the latter, and the coiled wire is straightened to form a stitched matrix line.

For stitching a next line the process is repeated.

However, said device suffers from a cardinal disadvantage which is inherent in the design of the magnetic-core feeding and fixing mechanism and resides essentially in that magnetic cores arranged in a row for being interwoven with a wire wound in coil, shift along the longitudinal slot, thus occupying therein one place or the other, inasmuch as each magnetic core has only one point of bearing in the bottom of the longitudinal slot. Said disadvantage is aggravated by a rather easy soiling of the longitudinal slot and its difficulty to clean.

Also known is a mechanism for feeding and fixing magnetic cores, incorporated into a device for mechanized interweaving of memory matrices using a unique method.

Said device comprises a structural base carrying a row of wires held thereto, and on which magnetic cores are strung. The magnetic-core feeding and fixing mechanism in said device incorporates a detacher and an orienter. The detacher of magnetic cores is arranged crosswise of said wires and is defined as two shaped combs of which one comb restricts the piles of magnetic cores from below, while the other comb separated from the first comb by a spacer equal in thickness to the height of magnetic cores, enters with its sharp edge, the gap between the bottom magnetic core and a next core and cuts off one core on each wire, after which the first (bottom) comb is retracted from the thus detached magnetic cores to let the cores to move down along their wires. The orienter is arranged in parallel with the detacher and is defined as shaped serrated strips by which the magnetic cores are turned and fixed in a preset oriented position. Said shaped strips have a longitudinal slot located along the parting joint thereof, and said slot forms the guide channel for the needle with the stitch wire within the zone of the magnetic cores.

The disadvantages inherent in said mechanism for feeding and fixing magnetic cores include its complexity involving precision manufacturing of a great number of components; damage inflicted upon the magnetic cores by the sharp edge of the shaped comb at the stage of detaching and by the shaped strips within the zone of fixation, which results in the magnetic cores getting chipped out and in some cases, completely destroyed. At present, such devices are used for interweaving small-sized matrices having magnetic cores with an outside diameter of 1 mm and over. Attempts made to provide a similar device for magnetic cores with an outside diameter of 0.8 mm are so far of no avail; on the other hand, necessity arises for interweaving up-to-date micro-miniature magnetic cores having an outside diameter of 0.6 to 0.3 and even 0.2 mm.

The disadvantage of the above device is also an inadequately clear-cut detaching of magnetic cores from piles, which imposes heavy strains upon the operator's eyes, affects labor productivity and in the case of microminiature magnetic cores possessing the properties of dust particles, makes the provision of such a device altogether impossible.

OBJECT AND SUMMARY OF THE INVENTION

It is an object of the present invention to provide a mechanism which solves the engineering problem of more reliable detaching, feeding and fixing of magnetic cores, as well as their withdrawal from the fixation zone by virtue of a simpler and more dependable method.

The above object is accomplished due to the fact that in a mechanism for feeding and fixing magnetic cores in a matrix interweaving device, defined as a shaft having at least one longitudinal slot for catching magnetic cores strung on wires in piles, and recesses arranged transversely to the longitudinal slot over the entire shaft length, the recesses, according to the invention have a width which enables accommodation of the bottom magnetic cores of the piles, and a depth exceeding that of the longitudinal slot, with the result that the edges formed by the bottom of the longitudinal slot and the side walls of the recesses define two stops to hold each magnetic core accommodated in the longitudinal slot against being displaced therealong.

Such a mechanism a one-by-one feeding and fixing of magnetic cores strung on wires in piles regardless of the size thereof. The mechanism is simple to carry into effect and is favorably applicable in devices for memory matrix interweaving with coiled wire to control the quality of the magnetic cores and count the quantity thereof.

BRIEF DESCRIPTION OF THE DRAWINGS

Other objects and advantages of the present invention will appear hereinafter from the following description of the exemplary embodiments thereof to be read in conjunction with the accompanying drawing, wherein the sole figure is a perspective view of a mechanism for feeding and fixing magnetic cores in a memory matrix interweaving device, according to the invention.

DETAILED DESCRIPTION OF THE INVENTION

Reference being now directed to the accompanying drawing, the mechanism for feeding and fixing magnetic cores in a memory matrix interweaving device is defined as a shaft 1 having rotary motion imparted thereto with respect to the axis thereof and having at least one longitudinal slot 2 adapted for catching magnetic cores 3 which are strung in piles 4 on wires 5 enveloping the shaft 1. Located over the entire length of the shaft 1 are recesses or grooves 6 arranged transversely to the longitudinal slot 2 and having a width large enough to accommodate the bottom magnetic cores 3 of the piles 4, with the width of the recesses 6 being such as to embrace about one-fourth of the outside circumference of the magnetic core 3 so that the bottom magnetic cores 3 of the piles 4 are reliably fixed in the recesses 6 and are not displaced along the axis of the shaft 1. Thus, the very bottom magnetic core 3 in the pile 4 prepared for being caught by the longitudinal slot 2 is kept in the most convenient position for its being accurately caught by said slot 2. The depth of each recess 6 exceeds that of the longitudinal slot 2, as a result of which edges 7 constituted by a bottom 8 of the longitudinal slot 2 and side walls 9 of the recesses 6 define two stops in the depth of the longitudinal slot 2 to hold each magnetic core 4 caught by the longitudinal slot 2, against being displaced therealong. The depth of the recess 6 should be large enough to ensure a free accommodation of a magnetic core 3 between the edges 7 without touching bottom 10 of the recess 6.

The operating principle of the above mechanism for feeding and fixing magnetic cores in a memory matrix interweaving device is as follows:

Prior to commencing the work, the magnetic cores 3 are strung in the piles 4 on the wires 5, with said piles being located above the shaft 1, and the wires 5 being held with some tension, by accommodating the piles 4 in the respective recesses 6 of the shaft 1.

The piles 4 are slightly forced against the shaft 1 by the weight of the magnetic cores 3 or, in case of microminiature magnetic cores 3 possessing the properties of dust particles, by the gravity of an additional weight (not shown) fitted on the wire 5 above the pile 4.

The bottom magnetic core 3 of each pile 4 is positioned near the point where the wire 5 touches the shaft 1 to form a rather strict row together with the similar magnetic cores 3 of the adjacent piles 4. Then, the slot 2 is brought towards said row of the bottom magnetic cores 3 prepared for being fed and fixed, by rotating the shaft 1 with the result that said magnetic cores 3 are free to engage the slot 2. With further rotation of the shaft 1, each magnetic core 3 caught by the longitudinal slot 2, rests in the depth of the longitudinal slot 2 upon the two edges 7 formed by the bottom 8 of the longitudinal slot 2 and the walls 9 of the recess 6, as if it were a prism, and is forced against said edges from inside by the wire running therealong.

In the thus fixed state, the row of the magnetic cores 3 is ready for any technological operation, such as interweaving with a coiled wire, checking the quality of the aligned magnetic cores, etc.

To release the magnetic cores 3 from the shaft 1, the shaft continues rotating to allow the magnetic cores 3 escape from the longitudinal slot 2.

Then, the longitudinal slot 2 is approached to the next bottom magnetic cores 3 in the piles 4, and the process is repeated.

The present mechanism is simple in design, easy to produce, and makes it possible to improve the quality of detaching and fixing magnetic cores, including microminiature cores having an outside diameter of 0.3 mm and less, reduce their damaging, diminish the strain upon the operator's eyes and increase labor productivity.

What is claimed is:

1. A mechanism for feeding and fixing magnetic cores strung in piles on wires in a memory matrix interweaving device, said mechanism including a shaft having at least one longitudinal slot for catching said magnetic cores, and recesses located over the length of the shaft and extending transversely to said longitudinal slot, said recesses having a width large enough to accommodate therein the bottom magnetic cores of said piles, and a depth exceeding the depth of said longitudinal slot, as a result of which the edges provided by the bottom of said longitudinal slot and the side walls of said recesses define two stops to hold each said magnetic core accommodated in said longitudinal slot, against being displaced therealong.

* * * * *